United States Patent Office 3,702,702
Patented Nov. 14, 1972

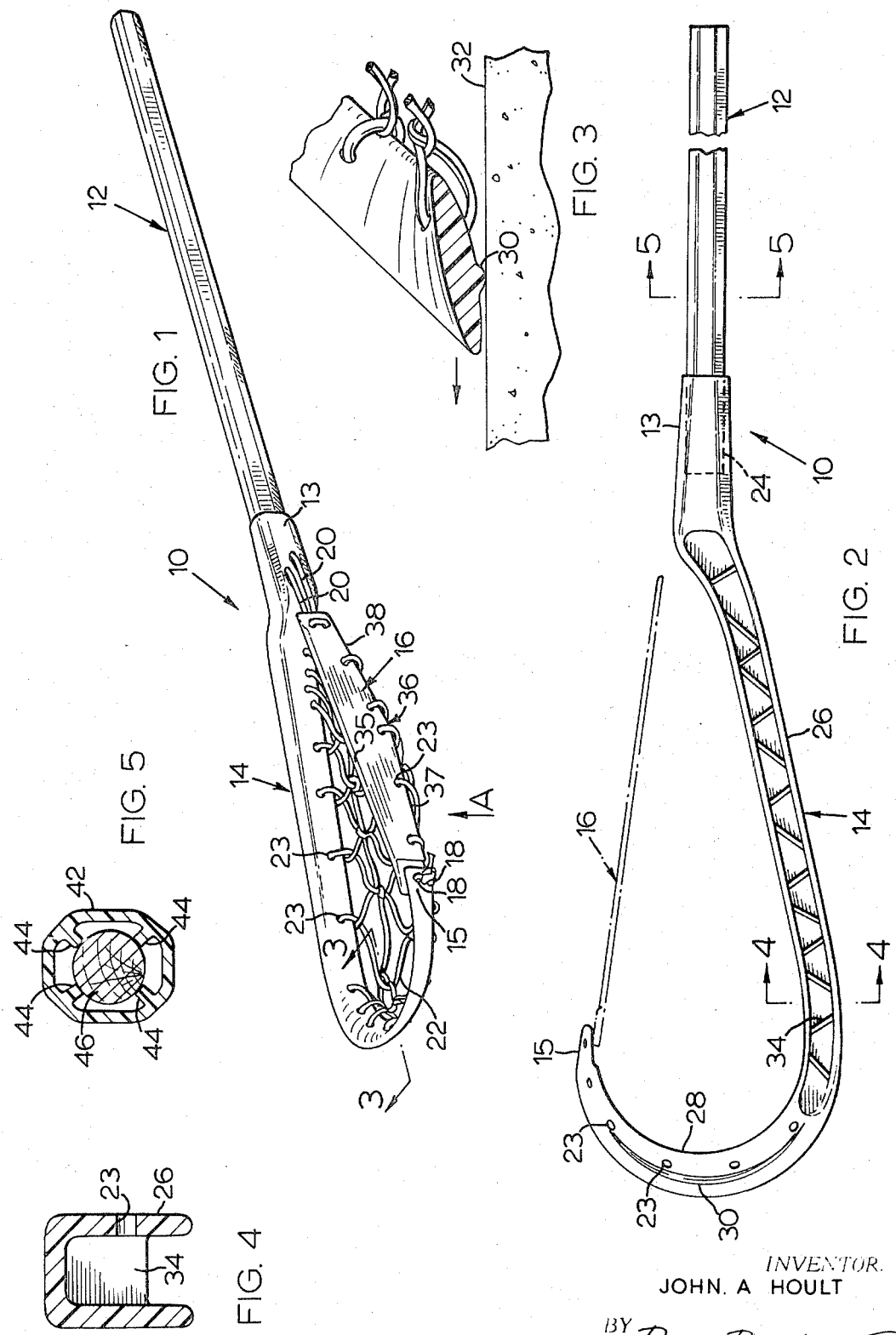

3,702,702
LACROSSE STICK
John A. Hoult, Toronto, Ontario, Canada, assignor to J. A. Hoult Enterprises Limited, Toronto, Ontario, Canada
Filed Aug. 1, 1969, Ser. No. 846,875
Int. Cl. A63b 65/12
U.S. Cl. 273—96 D          5 Claims

ABSTRACT OF THE DISCLOSURE

A novel guard, plastic hooked portion, and handle for a lacrosse stick. The hooked portion comprises in seriatim a shank adapted to receive the handle, a straight portion having a U-shaped cross-section, a curved portion and a toe, and the guard comprises a planar member having openings at opposite ends for attaching the guard to the shank and to the toe of the hooked portion. The handle comprises a tube having a plurality of inwardly extending longitudinal ribs and an elongated rod frictionally supported in the tube by the ribs.

---

This invention relates to an improved lacrosse stick.

Lacrosse sticks are traditionally made from a single piece of hickory wood which is formed into a straight handle and bent hooked portion. The open side of the hooked portion is closed by a guard formed from strands of strong cat gut or the like and a net is then attached to the hooked portion and to the guard for catching a ball. The guard is required to support the net securely so that the ball moves freely into and out of the net.

During use the guard tends to loose its shape which may result in inaccuracy when firing the ball since the guard will tend to interfere with the direction of the ball as the ball leaves the net.

It is a primary object of this invention to provide a lacrosse stick having an improved guard for supporting the net at the open side of the hooked portion, and it is a further object of the invention to provide a hooked portion made from plastic.

According to a preferred embodiment of the invention, a lacrosse stick is provided having a handle and a plastic hooked portion. The hooked portion has a shank at one end for connecting the hooked portion to the handle, and terminates in a toe at the other end. The open side of the hooked portion between the toe and the shank is closed by an elongated guard which is attached by strong leather strands to the toe and the shank. A net is strung between the hook portion and the guard and the handle is fitted into a socket in the shank.

In the drawings which illustrate a preferred embodiment of the invention:

FIG. 1 is a persepctive view of a lacrosse stick according to the invention;

FIG. 2 is a view from below the lacrosse stick in the direction of arrow A in FIG. 1;

FIG. 3 is a sectional view on line 3—3;

FIG. 4 is a sectional view on line 4—4; and

FIG. 5 is a sectional view on line 5—5.

As seen in FIG. 1 a lacrosse stick 10 of the type used in box lacrosse comprises a handle 12 which is rigidly attached to a shank 13 of a hooked portion 14. The hooked portion terminates at its distal end in a toe 15 and the open side of the hooked portion between the toe 15 and the shank 13 is closed by a guard 16. One end of the guard is attached to the toe of the hooked member, by leather strands 18, and the other end to the shank by strands 20. A net 22 is made up of leather strands which pass through openings 23 (FIG. 4) in the hooked portion 14 and through similar openings in the guard 16. Some of the holes 23 near the shank 13 preferably pass right through the hooked portion so that the strands of the net 22 which pass through these holes can be fastened outside the hooked portion for easy adjustment.

As seen in FIG. 2, the shank 13 of the hooked portion 14 includes a socket 24 for receiving an end of the handle 12, and a straight section 26 of the hooked portion 14 extends from the shank 24 towards a generally semi-circular curved section 28 which terminates in the toe 15. The shank 13, the straight section 26, the curved section 28, and the toe 15 are preferably formed in a single plastic molding of "Polysar" (trademark of the Polymer Corporation for an acrylonitrile styrene butadiene). The outer side of the curved section 28 includes a rib 30 which is best seen in FIG. 3. The rib 30 extends around the curved section to protect the strands of the net 22 when the lacrosse stick contacts the playing surface 32 or other object.

Reference is now made to FIGS. 2 and 4 which show the structure of the straight section 26. The weight of the straight section 26 is reduced by forming it with a generally U-shaped cross-section which opens out towards the under side of the lacrosse stick. The U-shaped cross-section is strengthened by ribs 34 which are formed integrally with the hooked portion 14 to strengthen the straight section 26. While the hooked portion 14 is preferably used with the guard 16, it can be strung conventionally with a cat gut guard or the like. Also the shape of the hooked portion may be modified for a goal-keeper's stick or for field lacrosse.

The guard 16 shown in FIG. 1 is generally planar and includes a straight upper edge 35 and a bottom edge 36 which consists of two angled portions 37 and 38 which slope rearwardly from the ends of the guard 16 to meet at the center of the bottom edge 36. The shape of the guard 16 may be varied but it is preferably as described to give shape to the net for catching the ball. The guard can be strung into any conventional lacrosse stick between the toe and the shank. (In a conventional stick the shank would be that part of the hooked portion where the hooked portion meets the handle.)

The handle 12 may be of wood or of plastic but it is preferably formed as shown in FIG. 5 wherein a flat-sided plastic tube 42 has inwardly extending longitudinal ribs 44 for strengthening the tube 42 and for frictionally engaging a rod 46 which also strengthens the handle 12. The rod is preferably round and made of wood but it may be made of any other suitable material such as aluminum tubing or aluminum rod and the shape of the rod may be changed if required. However the shape and type of material used should preferably provide a light and relatively rigid handle. The shape of the cross-section of the plastic tube 42 is optional although a non-circular cross-section improves a player's grip and makes for a rotation-resistant joint at the shank.

The guard 16 provides a relatively rigid support for receiving and firing the ball. The guard is preferably made of "Polysar" as in the case of the hooked portion 14, and it is made thin enough to be slightly pliable while being thick enough to retain its shape and support the net 22. The leather strands 18, 20 should be tightened occasionally to hold the guard securely in place with the strand 18 preferably holding the guard in overlapping relation with the toe 15 to give the guard 16 more stability.

The net 22 can be of any suitable form commonly used in lacrosse-sticks including the forms which have pieces of leather woven into the net to form an apron or stop. Also the net can be made as an integral plastic moulding and attached to the hook portion by any suitable means.

What I claim as my invention is:

1. A lacrosse stick comprising: a handle, said handle including a tube having a plurality of inwardly extending longitudinal ribs, and an elongated rod frictionally supported in said tube by said ribs; a hooked portion including a shank for connecting said hooked portion to said handle, a relatively straight section having one end attached to said shank, a curved section having one end attached to the opposite end of said straight section, at least a portion of said straight section having a U-shaped cross-section; and a guard comprising a generally planar member having at least one opening at a first end for attaching said guard to said shank, and at least one opening at the opposite end for attaching said guard to said toe.

2. A lacrosse stick comprising: a handle, said handle including a tube having a plurality of inwardly extending longitudinal ribs, and an elongated rod frictionally supported in said tube by said ribs; a hooked portion including a shank for connecting said hooked portion to said handle, a relatively straight section having one end attached to said shank, a curved section having one end attached to the opposite end of said straight section, at least a portion of said straight section having a U-shaped cross-section; and a guard attached to said hooked portion.

3. A hooked portion for a lacrosse stick said lacrosse stick having a handle and a net and said hooked portion comprising: a shank for connecting said hooked portion to said handle, a relatively straight section having one end attached to said shank, a curved section having one end attached to the opposite end of said straight section, at least a portion of said straight section having a U-shaped cross-section and a plurality of ribs extending across said U-shaped cross-section to reinforce said straight section.

4. A hooked portion as claimed in claim 3 wherein said hooked portion is of an acrylonitrile styrene butadiene plastic.

5. A hooked portion as claimed in claim 3 wherein said hooked portion further comprises a socket; said socket being formed in said shank for receiving said handle.

References Cited

UNITED STATES PATENTS

| | | | |
|---|---|---|---|
| 891,813 | 6/1908 | Ceel | 273—96 D |
| 1,452,803 | 4/1923 | Harris | 273—73 H |
| 2,103,889 | 12/1937 | Brisick | 273—81 B |
| 3,086,777 | 4/1963 | Lacoste | 273—73 H |
| 3,473,806 | 10/1969 | Patterson | 273—96 D |
| 1,777,822 | 10/1930 | Barrett | 273—81 R |
| 3,591,178 | 7/1971 | Milligan | 273—96 D |
| 3,507,495 | 4/1970 | Tucker | 273—96 D |

FOREIGN PATENTS

| | | | |
|---|---|---|---|
| 386,124 | 1/1933 | Great Britain | 273—80 D |

RICHARD C. PINKHAM, Primary Examiner

M. SISKIND, Assistant Examiner

U.S. Cl. X.R.

273—DIG 16